United States Patent [19]

Chang et al.

[11] 4,362,761
[45] Dec. 7, 1982

[54] USE OF HEAT COAGULATED WHEY PROTEIN CONCENTRATE AS A SUBSTITUTE FOR GELLED EGG WHITE

[75] Inventors: Pei K. Chang, Montrose; Gabriele E. Scibelli, New Rochelle, both of N.Y.

[73] Assignee: Nutrisearch Company, Cincinnati, Ohio

[21] Appl. No.: 220,209

[22] Filed: Dec. 23, 1980

Related U.S. Application Data

[63] Continuation of Ser. No. 54,042, Jul. 2, 1979, abandoned, which is a continuation of Ser. No. 858,322, Dec. 7, 1977, abandoned.

[51] Int. Cl.$^3$ .............................................. A23J 3/02
[52] U.S. Cl. .................................... 426/657; 426/583; 426/573; 426/614
[58] Field of Search ........................ 426/583, 573, 657

[56] References Cited

U.S. PATENT DOCUMENTS 2,695,235 11/1954 Goede ................................ 426/583
4,029,825 6/1977 Chang ............................. 426/583 X
4,031,267 6/1977 Berry et al. ...................... 426/657 X
4,058,510 11/1977 Nolan et al. ........................ 426/583
4,103,038 7/1978 Roberts ........................... 426/657 X

OTHER PUBLICATIONS

Palmer, D. E. High Purity Protein Recovery, Process Biochemistry, Jun., 1977, pp. 24–28.

Primary Examiner—Robert A. Yoncoskie
Attorney, Agent, or Firm—Cushman, Darby & Cushman

[57] ABSTRACT

Gelled egg white of the type normally found in hard boiled eggs can be replaced with substantially equivalent taste and mouth feel with a whey protein concentrate which is heat coagulated at a temperature of 80° C. to 100° C. at a pH within the range of about 7 to about 10.

7 Claims, No Drawings

USE OF HEAT COAGULATED WHEY PROTEIN CONCENTRATE AS A SUBSTITUTE FOR GELLED EGG WHITE

This is a continuation of application Ser. No. 054,042 filed July 2, 1979, now abandoned, which is a continuation of Ser. No. 858,322, filed Dec. 7, 1977, now abandoned.

The present invention relates to a substitute for solid gelled egg white as used in food products.

BACKGROUND OF THE PRESENT INVENTION

Egg white is a standard food material. Egg white performs the functions of foaming and gelling. Because of the cost of egg white, numerous attempts have been made to develop various substitutes for egg white which can be used at a more economical price. Included within these attempts have been the use of whey proteins and whey protein concentrates and derivatives as substitutes for egg whites in cakes and in foaming. Similar substitutes have been prepared from other protein sources such as soy beans as shown in U.S. Pat. No. 3,932,672. The prior art references are directed to processes for preparing a whippable product since this has been one of the main commercial functions of the egg whites.

Egg white is also known to be gellable into a solid material such as found in hard boiled eggs. Until recently, there has been no substantial commercial need for this material. However, new products have been developed which make extensive use of the gelling characteristics of egg white. Illustrative of these products are the extruded simulated foods such as imitation shrimp which rely upon the egg white as a binder for the rubbery, chewy bite needed. Also a new product has been developed which can be considered a deviled egg roll wherein egg whites are gelled into a long tube and packed with deviled yolk. The roll is sliced into appropriate portions for serving. Another area of use is egg salad which contains a large proportion of diced coagulated egg white.

It has now been found that coagulated egg white can be economically replaced in food systems with a product which provides substantially equivalent mouth feel, taste and appearance.

BRIEF SUMMARY OF THE INVENTION

In accordance with the present invention, it has been found that up to 100% of the egg albumen used in preparing solid gelled egg white can be replaced with a whey protein concentrate having at least 30% protein when used at a pH of from about 7 to about 10.

DETAILED DESCRIPTION OF THE PRESENT INVENTION

The whey protein concentrate which is used in the present invention is a product derived by concentrating the whey protein from cheese whey to a protein level of at least 30% and preferably 40% to 80% and most preferably 45% to 60%. The whey protein concentrate used in the present invention can be prepared by any one of the number of processes including electrodialysis (Shribley, R. C., Food Processing, Vol. 24, No. 1, page 49, 1963); reverse osmosis, (Marshall, P. G. et al., Fractionation and Concentration of Whey by Reverse Osmosis, Food Technology 22(a), 696, 1968); Gel Filtration as described in U.S. Pat. No. Re. 27,806 or by ultrafiltration as described in Horton, B. S., Food Technology, Vol. 26, page 30, 1972). Chemical methods including phosphate precipitation of whey protein can also be used as described in Gordon U.S. Pat. No. 2,377,624 and Melachouris U.S. Pat. No. 4,043,990. Other chemical techniques such as disclosed in U.S. Pat. No. 3,883,448 can also be used.

The cheese whey from which the whey protein concentrate is obtained can be derived from any cheese whey prepared as by-product of rennet precipitation (sweet or cheddar whey) or acid coagulation of cheese (acid cheese whey). Acid cheese whey is the by-product of the acid coagulation of milk protein by the use of a lactic acid producing bacteria, i.e., lactobacillus sp. or by the addition of food grade acids such as lactic or hydrochloric, i.e., direct acidification. In either acidification method, the acidification is allowed to proceed until a pH of approximately 4.6 is reached. At this pH, casein becomes insolubilized and coagulates as cheese curd, commonly known as cottage cheese. The whey obtained in this manner is commonly known as cottage cheese whey.

The cheese whey concentrate derived from acid cheese whey is preferred since this provides a final coagulated egg product which is white in color similar to coagulated egg albumen. Whey protein concentrate derived from sweet whey can advantageously be used in areas where the white color is unimportant as this product when coagulated under heat provides a brown color. However, the gels provided by whey protein concentrates derived from acid whey are higher in gel strength than gels derived from sweet whey. The present invention will be further illustrated in connection with acid cheese whey.

The whey protein concentrate as used in the present invention is preferably derived from 100% cottage cheese whey though minor amounts of other cheese whey up to 20% can be utilized. Such other cheese wheys include but are not limited to cheddar cheese whey which has been described hereinbefore. It is preferred that not less than 10% of the whey source be cottage cheese whey.

It has been found that the most effective results are obtained using an ultrafiltered cottage cheese whey concentrate containing from about 40% to about 80% and preferably from about 45% to about 60% whey protein. In a typical process, cottage cheese whey is neutralized to a pH of about 6.4 with 50% caustic. After storage, the pH is then adjusted to about 7.2 and any solids or precipitates are removed by centrifugal clarifiers. The clarified liquor is then pasteurized. The liquor is then fed into an ultrafiltration membrane unit. The retentate is condensed and spray dried. Protein products of above 40% whey protein can be prepared by this process. The products generally prepared by this method contain from about 40% to about 60% protein (TN×6.38), 10–30% lactose, 3–15% ash, and 0.1–4% fat. The dried retentate with the aforegiven composition is considered a whey protein concentrate.

The whey protein concentrate as used in the present invention must be substantially heat non-denatured. By heat non-denatured is meant that at least 50% of the protein has not been denatured by the heating which is utilized in the preparation such as in pasteurization and drying. In preparing a dried product, freeze-drying is a viable alternative since the amount of heat denaturation is less. Other forms or degrees of denaturation if mild will not effect the end-properties of the whey protein concentrate for the use herein intended.

The coagulation temperature of the whey protein concentrate is generally higher than the coagulation temperature of egg albumen. The coagulation temperature of the whey protein concentrate can be reduced by blending therewith a sulfite in an amount sufficient to and preferably from about 0.1% to about 1.0% to reduce the temperature from about 80° C. to about 70° C. Representative food grade sulfites which can be used are illustrative by sodium sulfite, sodium bisulfite, cysteine, and cystine and the like. The reduction in coagulation temperature could be considered an important aspect in adapting the substitute to an existing commercial process, presently geared to egg albumen.

The heat coagulated whey protein concentrate gels of the present invention are prepared by dispersing a dried whey protein concentrate in water to form a solution having a solids content within the range of from about 10% to about 30% and preferably from about 15% to about 25% on a weight per volume basis. The whey protein concentrate could also be used in a liquid form as it is recovered from the protein concentration steps. Because of the propensity of this liquid whey protein concentrate solution to spoilage, the use of the same should be in close proximity to the factory that prepares the concentrate. Shipping and storage must be under refrigeration conditions.

The pH of the whey protein concentrate solution is adjusted to any pH within the range of from about 7 to about 10. This can be easily effected by admixing with the concentrate a small amount of a food grade base such as sodium hydroxide or sodium carbonate. Care should be taken to avoid excess pH treatment as this may denature the protein.

The whey protein solution can also include other desirable materials such as stabilizers, flavor and the like.

The whey protein concentrate material can then be gelled in any manner similar to the gelling conditions used for egg albumen. These include boiling, extruding under hot conditions and the like. The gelation temperature generally ranges from about 80° C. to about 100° C. The gelation time is dictated by the gelation temperature, concentration and pH and normally requires from about 10 to about 30 minutes and generally about 20 minutes. The gelation temperature of the whey protein concentrate is normally higher than that of the egg albumen but this can be lowered by adding the sulfite as has been discussed hereinbefore.

The product of the present invention can be used as total or partial replacement for egg white in forming any solid gel. However, while it is preferred to totally replace the egg white, blends with up to 90% egg white solids can be made. Following gelation, the gel can be worked in manner similar to solid coagulated egg white.

The gelled egg white substitute of the present invention is useful in preparing extruded imitation food products, egg salads, deviled eggs and any similar use of gelled solid egg white.

The invention is further illustrated in the examples which follow.

EXAMPLE 1

A whey protein concentrate containing approximately 50% protein prepared by the ultrafiltration of cottage cheese whey and dried by spray drying in accordance with the procedure previously discussed was dispersed in water to prepare a 15% solution on a weight per volume basis. The pH was adjusted to 7, 8, 9 or 10 using sodium hydroxide. Samples were placed inside glass dishes and heated in a 95° C. water bath for 22.5 minutes. Following gelation, products were cooled immediately to room temperature. The hardness, cohesiveness and brittleness of the gel at 25° C. was measured following an overnight storage in the refrigerator. As a comparison, an albumen gel made with dried egg albumen powder at a 9.375% solids basis was used as control. Hardness, cohesiveness and brittleness were tested according to the following procedures:

PROCEDURE

An Instron Universal Testing Instrument (Model 1130) and a multiple bite compression test was used.

A plunger (5.5 cm dia) fitted on a 200 lb. load cell was selected to compress a one inch cube of gel from 25 mm to 7 mm and then returned to 25 mm and repeat a second time.

The hardness (lbs.) was measured as compression force required to compress the gel at 17 cm on recording chart paper after start of compression.

The brittleness (lbs.) was measured as the height of plateau of the first compression.

The cohesiveness was measured as the ratio of two areas from compression two to compression one (Area 2/Area 1).

The following data was recorded:

TABLE I

| Example | pH | Hardness (lbs.) | Brittleness (lbs.) | Cohesiveness (lbs.) |
|---|---|---|---|---|
| 1 Whey Protein Concentrate 50% Pro. | 7.0 | 4.1 | 6.9 | 0.140 |
| 2 Whey Protein Concentrate 50% Pro. | 8.0 | 3.3 | 7.5 | 0.114 |
| 3 Whey Protein Concentrate 50% Pro. | 9.0 | 2.4 | 5.2 | 0.123 |
| 4 Whey Protein Concentrate 50% Pro. | 10.0 | 0.3 | 5.4 | 0.091 |
| 5 Egg Albumen | 7.0 | 0.6 | 3.7 | 0.142 |
| 6 Egg Albumen | 8.0 | 0.7 | 3.9 | 0.107 |
| 7 Egg Albumen | 9.0 | 0.9 | 4.5 | 0.114 |
| 8 Egg Albumen | 10.0 | 1.7 | 6.3 | 0.062 |

As can be seen from this data, the hardness of the gels prepared using the whey protein concentrate was reduced drastically as the pH of the gels progressively increased from 7 to 10. Under the same conditions, the hardness of albumen gels increased only slightly upon pH adjustment. A similar degree of hardness for both gels was obtained between pH's 9 and 10. As can be seen from the data regarding the brittleness of the gels, a similar trend was observed.

The cohesiveness of the gels were high for both albumen and the whey protein concentrate at pH's 7 and 9.

The heat coagulated whey protein concentrate gels were applied in several food applications.

EXAMPLE 2

EGG SALAD

An imitation egg salad incorporating the following ingredients was prepared.

20 grams yolk (hard boiled egg)

40 grams gelled whey protein concentrate (diced) prepared in accordance with the above procedure at pH 7.
25 grams mayonnaise
1.0 grams salt.

This product was given to a small panel of judges who rated the flavor comparable to real egg salad prepared from hard cooked eggs. A slight texture difference was observed. This was judged not to be significant enough to make a product unacceptable.

EXAMPLE 3

PUDDING

A pudding-like product was formulated using the following ingredients:

15% whey protein concentrate (50% protein)
10.2% sucrose
6.0% cocoa powder blend
68.8% water The whey protein concentrate, sucrose and cocoa powder were blended with the water to prepare a solution which was then heated to 95° C. for 22.5 minutes. The texture of the pudding-like product was chewy. A slight cocoa separation was observed. The addition of a small amount of carrageenan will prevent this separation.

The present invention is further defined in the claims which follow.

What is claimed is:

1. A method for preparing an imitation hard-cooked egg white having a consistency similar to hard-cooked egg whites which comprises heating a solution consisting essentially of a whey protein concentrate prepared by ultrafiltration having from about 40% to about 60% protein, from about 10% to about 30% lactose and from about 3% to about 15% ash at a solids content of from about 10% to about 30% at a temperature of about 80° C. to about 100° C. for a period of time for about 10 minutes to about 30 minutes in order to prepare a product having the consistency and appearance of hard-cooked egg white.

2. The method as recited in claim 1 wherein said concentrate is prepared from at least 80% acid whey.

3. The method as recited in claim 1 wherein said whey protein concentrate has from 45-60% protein.

4. The method as recited in claim 1 wherein a food grade sulfite is added in an amount sufficient to lower the coagulation temperature of the concentrate to a temperature within the range of 70° C. to 80° C.

5. The method as recited in claim 4 wherein said sulfite is selected from the group consisting of sodium sulfite and sodium bisulfite.

6. The product of the method of claim 1.

7. The method as recited in claim 1 wherein a member selected from the group consisting of cysteine and cystine is added in an amount sufficient to lower the coagulation temperature of the concentrate to a temperature within the range of 70° C. to 80° C.

* * * * *